United States Patent [19]

Blakeslee, III et al.

[11] 4,447,387
[45] May 8, 1984

[54] PROCESS FOR MANUFACTURE OF TUBULAR FILM

[75] Inventors: Theodore R. Blakeslee, III, Hillsborough; Randall Wu, Matawan, both of N.J.

[73] Assignee: Union Carbide Corporation, Danbury, Conn.

[21] Appl. No.: 430,370

[22] Filed: Sep. 30, 1982

[51] Int. Cl.³ .............................................. B29D 7/22
[52] U.S. Cl. .................................... 264/566; 264/569; 425/72 R; 425/326.1
[58] Field of Search ............... 264/566, 569, 568, 564, 264/237, 348; 425/72 R, 326.1

[56] References Cited

U.S. PATENT DOCUMENTS

| | | | |
|---|---|---|---|
| 3,167,814 | 2/1965 | Corbett | 264/568 |
| 3,210,803 | 10/1965 | Najar | 425/72 R |
| 3,548,042 | 12/1970 | Hinricks | 264/569 |
| 3,568,252 | 3/1971 | Masuda et al. | 264/569 |
| 3,888,609 | 6/1975 | SaintEve et al. | 264/569 |
| 3,957,566 | 5/1976 | Rahlfs | 264/173 |
| 4,243,619 | 1/1981 | Fraser et al. | 264/176 R |
| 4,282,177 | 8/1981 | Kurtz et al. | 264/564 |
| 4,294,746 | 10/1981 | Blair et al. | 260/37 |
| 4,302,565 | 11/1981 | Goeke et al. | 526/88 |
| 4,330,501 | 5/1982 | Jones et al. | 264/569 |

FOREIGN PATENT DOCUMENTS

| | | | |
|---|---|---|---|
| 2259732 | 6/1974 | Fed. Rep. of Germany | 264/569 |
| 54-5425 | 3/1979 | Japan | 264/569 |
| 55-166225 | 12/1980 | Japan | 264/508 |
| 1120075 | 7/1968 | United Kingdom | 425/326.1 |

Primary Examiner—Jeffery R. Thurlow
Assistant Examiner—Patrick Dailey
Attorney, Agent, or Firm—Clement J. Vicari

[57] ABSTRACT

A process for forming a blown film from a thermoplastic resin wherein a source of cooling air is induced to flow from the atmosphere in contact with another source of pressurized cooling air whereby increased production rates can be obtained.

13 Claims, 1 Drawing Figure

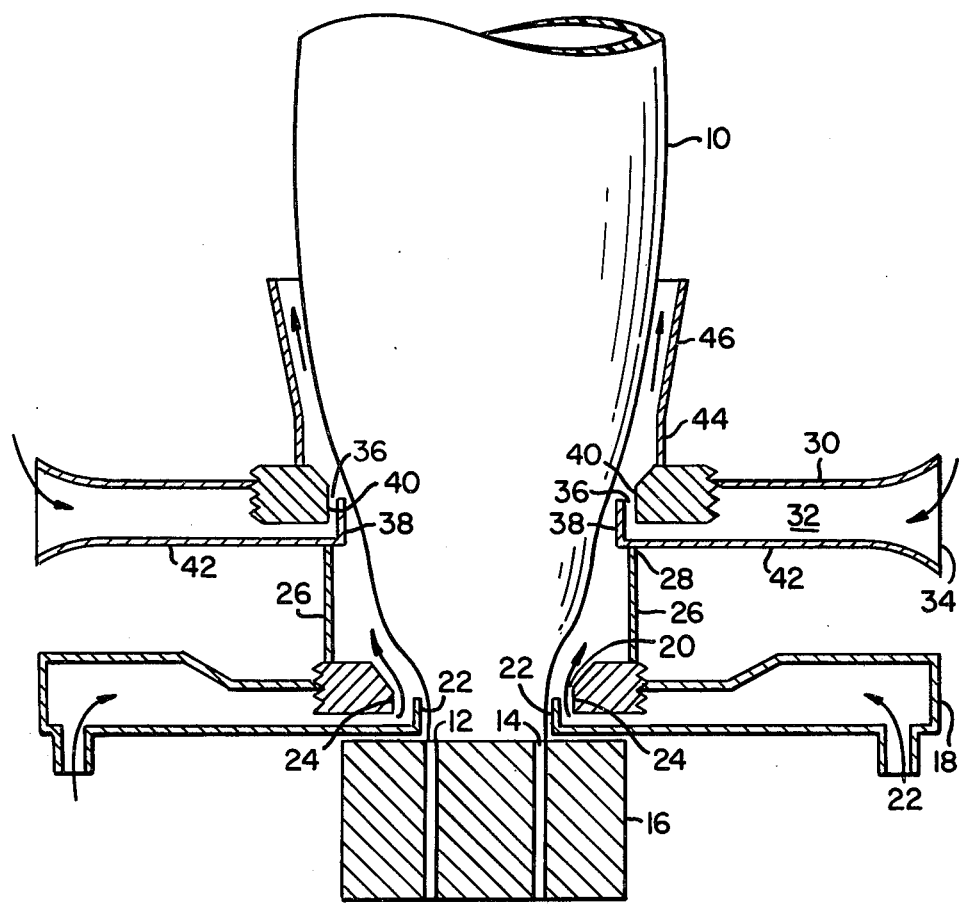

PROCESS FOR MANUFACTURE OF TUBULAR FILM

BACKGROUND OF THE INVENTION

1. Field of the Invention

The present invention relates to a process for the tubular blown film extrusion of a thermoplastic resin and more particularly and in a preferred embodiment, to an improvement in a process for the tubular blown film extrusion of a linear (low pressure) low or high density ethylene polymer.

2. Description of the Prior Art

In a conventional technique for forming tubular blown film suitable for the fabrication of bags and the like, a film-forming polymer, such as polyethylene, is extruded through an annular die arranged in an extrusion head so as to form a tube of molten polymer having a smaller outer diameter than the intended diameter of the eventually-produced film tube. In one technique, the film tube is drawn radially in its path upward from the die lips of the annular die by a force created by the differential pressure resulting from the cooling air flow from a venturi type lip air ring and the internal bubble pressure. The film tube is typically drawn radially only about one half to one inch prior to being contacted by the cooling air flow, and prior to contact it is usually drawn down to no more than half of its thickness at the die exit. The subsequent crystallization kinetics and rheological dynamics influence the resultant film optical and physical properties. Illustrative of prior art techniques utilizing the venturi type cooling modes and the effects upon film properties can be found for example in U.S. Pat. No. 3,167,814, 3,210,803 and 3,548,042. After cooling to solidify the molten tube, the tube is directed through flattening means such as a collapsing frame and a pair of driven rollers, to flatten the extruded film tube. Between the point of extrusion and the terminus of the flattening means, the film tube is expanded by means of air or some other gaseous medium to thereby form an expanded film tube and the film tube is maintained by the gas trapped within the expanded film tube between the die and collapsing means. The driven nip rolls draw the molten tubular film away from the annular die at a speed greater than the extrusion speed. This, together with the radial expansion of the molten film tube, decreases the film thickness and orients the blown film in both the machine and transverse directions. The degree of radial expansion and the speed of the driven nip rolls may be controlled to provide the desired film thickness and orientation. The location at which the film tube essentially completely solidifies is referred to in the art as the "Frost Line".

Thus, in short the polymeric material exits the die as a molten tube. It is subsequently expanded, drawndown and cooled and eventually becomes what is known in the art as a film bubble. The point of transition from a molten tube to a film bubble is not well defined, and hence for purposes of the present invention, reference will be made to a film tube to describe the polymeric material from its exit from the die to its final collapse at the nip roll.

Thermoplastic materials which may be formed into film by the tubular blown film process include polymers of olefins such as ethylene, propylene, and also include polyvinyl chloride, polystyrene, polyamide, polyesters, and the like. Of these polymers, low density polyethylene (i.e., ethylene polymers having a density of about 0.94 g/cc and lower) constitutes the majority of film formed by the tubular blown film process. As used herein, the term ethylene polymers includes ethylene homopolymers, and copolymers of ethylene with one or more comonomers. Conventionally, low density ethylene polymers have in the past been made commercially by the high pressure (i.e., at pressures of 15,000 psi and higher) polymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly-assigned, U.S. Pat. No. 4,302,565. It has also been recently determined that resins similar to the above low pressure process resins have been made in modified conventional LDPE equipment; e.g. tubular or stirred reactor equipment. Such resins have similar extensional viscosity indexes and the process of this invention will also apply to those resins.

The above-identified U.S. Patent discloses a low pressure, gas phase process for producing low density ethylene copolymers having a wide density range of about 0.91 to about 0.94 g/cc and a melt flow ratio of from about 22 to about 36 and which have a relatively low residual catalyst content and a relatively high bulk density. The process comprises copolymerizing ethylene with one or more $C_3$ to $C_8$ alpha-olefin hydrocarbons in the presence of a high activity magnesium-titanium complex catalyst prepared under specific activation conditions with an organo aluminum compound and impregnated in a porous inert carrier material. The copolymers (as applied to these polymers, the term "copolymers" as used herein is meant to include polymers of ethylene with 1 or more comonomers) thus prepared are copolymers of predominantly (at least about 90 mole percent) ethylene and a minor portion (not more than 10 mole percent) of one or more $C_3$ to $C_8$ alpha-olefin hydrocarbons which should not contain any branching on any of their carbon atoms which is closer than the fourth carbon atom. Examples of such alpha-olefin hydrocarbons are propylene, butene-1, hexene-1, 4-methyl pentene-1 and octene-1.

The tubular blown film extrusion process may be employed to form a film from low pressure-low density ethylene polymers. For example, a process for forming film from one such low pressure-low density ethylene polymer is disclosed in commonly-assigned, U.S. Pat. Nos. 4,243,619 and 4,294,746. However, it has been found that in some cases the film production rates obtained in tubular film processes with certain thermoplastic resins and particularly with low pressure-low density ethylene polymers, utilizing conventional cooling devices and techniques which cool with air rings of the type which direct air flow in a manner such as to create a reduced pressure zone e.g., by a venturi effect, are low. Many attempts have been made to increase tubular film production without sacrifice of film properties. Thus according to U.S. Pat. No. 3,568,252, there is disclosed a method of manufacturing a tubular film stably from thermoplastic resins. The method utilizes an annular cooling device having a coolant chamber provided with slits for blowing a gaseous coolant for preliminary cooling against a tubular film in a horizontal direction to no more than 30° of angle of elevation. The device also includes means defining an inflating chamber for preliminarily inflating the tubular film thus preliminarily cooled and a second coolant chamber provided with slits for blowing a gaseous coolant for final cooling against the preliminarily inflated tubular film in parallel direction with respect to the running direction of the tubular film to no more than 30° of inclination towards axis of the tubular film. The inflating chamber is interposed between the two coolant chambers and suction is created in the inflating chamber by the blown final cooling coolant.

Unfortunately, the process and apparatus disclosed in U.S. Pat. No. 3,568,252 is not entirely satisfactory for processing certain thermoplastic resins and particularly linear low density ethylene polymers because of the low rates obtained.

Specifically, the properties of low pressure-low density ethylene polymers are such that commercially desirable high film production rates have not been achieved without film tube instability. Stated conversely, film tube instability problems prevent the commercially desirable high film production rates from being obtained in blown film extrusion processes including those utilizing venturi action for cooling and film tube expansion with low pressure-low density ethylene polymers. Among the reasons for such failures, it is believed; is the extensional rheology of low pressure-low density ethylene polymers. When these low pressure-low density ethylene polymers are extruded from the die in tubular blown film processes and are externally cooled by blowing air against the resin with venturi type action as mentioned previously, the film tube becomes unstable by the increased cooling required by increased throughput rates. In other words, film bubble instability results at higher throughput rates since such rates require more heat transfer in the cooling process which is usually accomplished by increasing the amount and/or velocity of cooling air which in turn causes bubble instability e.g. the film bubble becomes non-uniform due to the extensional behavior of these low pressure-low density ethylene polymers.

Thus one of the major rate limiting factors in the extrusion of LLDPE blown film is reduced bubble stability due to the inherent low-strain hardening extensional behavior of the polymers. It would therefore be desirable to produce LLDPE blown film at high rates without sacrifice of film properties.

SUMMARY OF THE INVENTION

Broadly contemplated, the present invention provides a process for forming a blown film from a thermoplastic resin which comprises extruding said resin through the die lips of a tubular film die to form a film tube, expanding said film tube and directing a pressurized cooling medium in initial contact with said film tube, passing said cooling medium through a chamber surrounding said film tube, providing an air collar on the downstream edge of said chamber said air collar having discharge means for discharging cooling air substantially in the direction of film travel, and having an air conduit leading from the atmosphere to said discharge means, passing said cooling medium past said discharge means to create a reduced pressure zone proximate said discharge means and said film tube, providing a source of flow of cooling air, said cooling air being induced to flow from the atmosphere through said air conduit as a result of the differential pressure between the atmosphere and said reduced pressure zone said induced air exiting said discharge means substantially in the direction of film travel.

According to the invention, the chamber which surrounds the expanding film tube is connected at its upper edge to the bottom of the air collar and at its lower edge to the top of the fluid medium delivery device, such as an air ring.

Each of the fluid delivery devices i.e. the lower air ring and the upper air collar is provided with discharge means. In the case of the upper air collar, the air is discharged substantially in the direction of film travel. Thus the process of the present invention utilizes a discharge passageway for the upper air collar which is formed by an extended lip and one face of an annular collar whereby the air is discharged substantially in the direction of film tube travel. For the lower fluid delivery device, although it is preferred to discharge the air in the direction of film travel, this however is not necessary and the air can be discharged either parallel to the film travel or perpendicular to film travel, or some point in between.

DESCRIPTION OF THE DRAWINGS

The sole figure in the drawing is a schematic representation of a tubular blown film extrusion process of the invention showing the positioning of the induced flow air collar and the path of travel of the film tube and the fluid streams or flows utilized for cooling.

DESCRIPTION OF THE PREFERRED EMBODIMENTS

Though generally applicable to thermoplastic polymers as previously mentioned, for purposes of ease of description only the present invention will be described herein by reference to "pressure-low density ethylene polymers".

As used herein, the language "low pressure-low density ethylene polymers" means homopolymers and copolymers of at least about 85 mole percent ethylene with no more than about 15 mole percent of at least one $C_3$ to $C_8$ alpha-olefin hydrocarbon comonomer (e.g., propylene, butene-1, hexene-1, 4-methyl pentene-1 and octene-1) which are copolymerized under low pressure (e.g., 150 to 350 psi). For low density materials, such copolymers normally have a density no greater than about 0.94 g/cc and typically their density is from about 0.91 to about 0.93 g/cc. In addition, such polymers generally have a narrow molecular weight distribution range (Mw/Mn) of about 2.7 to about 5. A specific example of methods for preparing such copolymers is more fully described in U.S. Pat. No. 4,302,565 which is hereby incorporated by reference.

In the tubular blown film extrusion process, a molten polymer is extruded through an annular die to form a film tube. The film tube is expanded with pressurized gas, cooled and collapsed and then usually wound flat on rolls. Optionally, the film tube may be slit before rolling. Film made by such a process may have a wide range of thicknesses depending upon the particular polymer and end use requirements. In the case of low pressure-low density ethylene polymers, film thicknesses within the range of about 0.1 mil to about 20 mils may be formed by tubular blown film extrusion although most film formed of these polymers will be within the range of about 0.25 mil to about 8 mils, preferably about 0.5 mil to about 4 mils and most preferably 0.5 mils to about 2.0 mils. As in conventional tubular blown film extrusion processes, the film bubble is formed and maintained by inflating and maintaining a positive pressure of gas (e.g., air or nitrogen) inside the tubular film. The gas pressure is controlled to give the desired degree of expansion of the extruded tubular film. The degree of expansion, or so-called blow-up ratio, as measured by the ratio of the fully expanded tube circumference to the circumference of the die annulus, may be within a range of about 1/1 to about 6/1 and preferably from about 1/1 to about 4/1.

According to conventional techniques, film bubble instability problems prevent the commercially desirable high film production rates from being obtained in blown film extrusion processes utilizing venturi action for cooling and film tube blow-up with low pressure-low density ethylene copolymers and those other thermoplastic polymers as described previously.

Reference is now made to the drawing which schematically illustrates a portion of a tubular blown film extrusion process employing the techniques of the present invention to advance and cool the molten film tube. Specifically, a molten tube is shown being extruded through die lips 12 defining die gap 14 of an annular die 16 in a vertically upward direction and which is expanded to form film tube 10. The tube may also be extruded downward or sideways as is known in the art. The upstream apparatus (e.g. an extruder, etc.) is not shown although conventional process and apparatus may be employed to melt and advance the polymer material to the annular die 16. Similarly, although no downstream apparatus (e.g., collapsing and flattening means, windup rolls, etc.) is shown, conventional apparatus and processes may be used to treat and handle the film.

As shown in the drawing, the film tube 10 is cooled with air or other fluid directed against the outside perimeter of the film bubble through a cooling ring 18 having a single air discharge orifice 20. It will of course be understood that multiple cooling orifices and cooling rings can also be used.

A source of pressurized cooling medium such as air is forced by a blower (not shown) into cooling ring 18 through inlet 22 and is discharged from cooling ring 18 through discharge orifice 20 substantially perpendicularly in initial contact with the film and thence passes in the direction of film travel, as indicated by the arrows. Preferably however the air is discharged from orifice 20 substantially parallel to the direction of film travel. Thus, as shown in the drawing, the discharge orifice 20 is formed by extended lip 22 and the inner face 24 of cooling ring 18 and provides discharge orifice 20 through which the cooling air passes in the direction of film travel.

Referring again to the drawing, the pressurized cooling air is passed through chamber 26 which surrounds the expanding film tube 10. Mounted on the upper edge 28 of chamber 26 is an induced air flow collar 30.

Chamber 26 is mounted between air ring 18 and induced flow air collar 30 and is mounted above air ring 18. Chamber 26 can be essentially sealed or alternatively mounted above air ring 18 with a gap of approximately ⅛ inch separating the two. Chamber 26 preferably has a diameter which is at least 4 inches greater than the diameter of the innerface 24 of air ring 18. Moreover the height of chamber 26 is preferably 3 to 12 inches and most preferably 3 to 6 inches. Normally, the induced flow air collar 30 has an inside diameter of about 1.5 to about 3.0 times the die diameter and preferably about 1⅝ to about 2.5 times the die diameter. The outside diameter of the induced flow air collar 30 should be such that flow irregularities entering the device will be damped out upon exiting. Generally, therefore, an outside diameter between about three to four times the die diameter is adequate.

The induced flow air collar 30 is designed to minimize flow obstructions that tend to reduce the magnitude of air which is induced to flow through the collar as will be explained hereafter. Thus the induced flow air collar 30 is provided with conduit 32 which is in communication with the atmosphere through inlet 34 and which has provision for discharging air through discharge orifice 36.

As will be seen from the drawing, the discharge orifice is preferably of similar configuration to the discharge orifice of the lower cooling ring 18.

The discharge means of the induced flow air collar 30 includes the discharge orifice 36 which is formed by extended lip 38 and the inner face 40 of induced flow air collar 30. The lower base 42 of air collar 30 projects beyond chamber wall 26 and the vertical extended lip 38 together with the extended lower base forms a restricted passageway between the expanding film tube and the extended vertical lip 38. Thus any pressurized cooling gas discharged from discharge orifice 20, passes in the direction of film travel towards and beyond the discharge means of induced flow air collar 30 and results in a reduced pressure zone proximate the discharge means of induced flow air collar 30 and the film tube 10.

Mounted on the upper inner surface of induced flow air collar 30 is a gas flow rectifier or diffuser 44 which concentrically envelopes the film tube 10. The gas flow rectifier preferably has a diverging exit 46 that allows for intimate contact between the force or pressurized-/induced air mixture and the film tube. The diverging exit allows for a controlled expansion of the cooling air into the atmosphere, thus minimizing undesirable large scale turbulence which creates bubble instabilities. Gas flow rectifier 44 preferably has a lower diameter of about 1 to 3 inches greater than the diameter of inner face 40 of induced flow air collar 30. The height of gas flow rectifier 44 is preferably between about 2 to 12 inches and most preferably between about 3 to 10 inches although generally larger dies can utilize heights greater than about 10 inches. The angle of diverging exits 46 can be 5° to about 30° and preferably is about 10° measured from the axis of the film tube.

The pressurized cooling medium can comprise any cooling fluid which is preferably non-toxic and which can provide cooling in such a manner as to create a reduced pressure zone as described previously. Air is the preferred cooling medium.

The cooling air is preferably refrigerated as is conventional; for example, when processing low pressure-low density ethylene copolymers, the cooling air is preferably refrigerated to a temperature of about 40° to 60° F. The pressurized cooling medium can comprise any cooling fluid which is preferably non-toxic and which can provide cooling in such a manner as to create a reduced pressure zone as described previously. Air is the preferred cooling medium. Employing such refrigerated air enables the film tube to be cooled more rapidly, permitting higher production rates and improved optical properties and is therefore preferred. Generally, in the case as schematically illustrated in the drawing, refrigerated cooling air can be fed to the cooling ring 18 at a rate of about 30 to 100 SCFM per inch of die diameter.

As mentioned previously, pressurized cooling gas discharged from discharge orifice 20, passes in the direction of film travel towards and beyond the discharge means of induced air flow collar 30 and results in a reduced pressure zone proximate the discharge means of induced flow air collar 30 and film bubble 10. As a result, air is induced to flow from the atmosphere through conduit 32 and exits the discharge means in the direction of film travel. The velocity of the air is minimal, generally in the order of about 1 to 15 feet per second. It was therefore quite surprising that dramatic improvements in production rates could be obtained according to the instant invention and advantageously without any appreciable loss of properties of the film.

For low pressure-low density ethylene polymers, the molten tube generally exits the die at a temperature between 380° to 480° F., preferably between 400° and 450° F. Where the temperature is too low, the risk of the films splitting increases and with temperatures above about 480° F., the likelihood of degradation of the polymer is increased. The minimum temperature of the resin is a function of its melt index with lower melt index resins requiring higher processing temperatures. However, it has been observed that melt temperature may affect optical properties and generally film clarity may be improved at the lower temperatures.

The process of the present invention may be practiced over a broad range of production rates as measured in terms of die rate, i.e., pounds per hour per inch of die circumference (lbs/hr-in.). In extrusion trials, it has been possible to produce film from these polymers at high die rates in the order of more than about 16 pounds per hour per inch of die circumference. Moreover, die rates in the prior art tubular film process has been limited with these resins by bubble stability. Advantageously, according to the process of the present invention, not only are there improved rates while still maintaining bubble stability, but advantageously, films are produced without appreciable loss of film properties. Thus according to the process of the invention, die rates exceeding those normally utilized for commercial ethylene polymer tubular film production can be achieved. The process of the present invention can be most beneficially utilized at die rates greater than about 5 lbs/hr-in, preferably 5 to 16 lbs/hr-in and most preferably about 9 to 16 lbs/hr-in.

As disclosed in U.S. Pat. No. 4,243,619, low pressure-low density ethylene copolymers may be formed into film without melt fracture by the tubular blown film extrusion using a die gap of greater than about 50 mils. For the process of the present invention, the die gap may be on the order of from about 50 to about 150 mils but greater or smaller die gaps may be used. The presently preferred die lip configurations are those disclosed in commonly-assigned, U.S. Pat. No. 4,282,177. Generally, as disclosed therein, the die lip and/or die land in contact with the molten polymer is at an angle of divergence or convergence relative to the axis of flow of molten polymer through the die. Such configurations reduce melt fracture in the film product.

The technique of the present invention can be used to maintain a symetrical tube shape for the extruded film tube i.e., maintain a smooth profile with the fewest number of bulges and contractions. Depending upon the particular resin being processed, the size of the die and die gap, and the production rate, it may be necessary to conduct some amount of trial and error operations to select the optimum configuration to obtain an optimum film bubble shape. Based upon the following considerations, one of ordinary skill in the art can obtain the desired bubble shape.

Generally, a conventional commercially-available air ring can be employed as the lower cooling ring of the present invention.

The configuration of the lips of at least one of the cooling rings (if more than one cooling ring is employed to deliver pressurized fluid) used in the present invention is such that an external reduced pressure zone is created in an area between the cooling lip and the film tube. Such a reduced pressure zone has a vacuum effect which draws the film tube toward the cooling ring. Generally, the lip configurations which favor the formation of the reduced pressure zone are those which both direct the cooling fluid against the film tube in a direction as parallel to the film tube as much as possible and maintain a restricted cross-sectional space between the cooling ring and film tube through which the cooling medium flows. Specifically, higher lower lip heights favor parallel flow and improved bubble stability. In some instances, the reduced pressure zone may tend to cause the film tube to be deflected toward or contact the lower lip of the air ring unless the machine direction strength of the film tube is high, or the height of the lower lip is decreased, or the lower lip is recessed into the face of the die.

Those skilled in the art may, based upon the foregoing considerations, select appropriate lip configurations and geometries to achieve a stable film bubble having the desired film bubble shape of the present invention.

The examples which follow further illustrate conditions for achieving the desired results.

The term "melt index" means the melt index determined as specified in ASTM D-1238, Condition E, measured at 190° C. reported as grams per 10 minutes.

EXAMPLE I

This Example demonstrates the increase in maximum stable rate obtained on blown film line. The results are listed for a run with and without an Induced Flow Air Collar.

The resin used was GRSN-7047 which is a 1.0 melt index, 0.918 g/cc density low pressure polymerized ethylene and butene-1 and which is commercially available from Union Carbide Corp.

The extruder utilized was a 2½ inch diameter NRM extruder having a barrel length to diameter ratio of 16 to 1 and a 16 to 1 length to diameter ratio screw.

The extruder had a 50 HP drive and 3 barrel heating zones. The die used was a 6 inch diameter Egan spiral mandrel die with a final die gap of 105 mils.

The base cooling ring was an Egan single lip air ring with four inlet ports. Air was supplied by a 7½ HP blower through a 6 inch supply line. The air ring was mounted with a ⅛ inch air gap between the die and the air ring's bottom surface. The operating conditions are given below for maximum stable operation:

| Operating Conditions | Without Induced Flow Air Collar | With Induced Flow Air Collar |
|---|---|---|
| Extruder Screw Speed, RPM | 50 | 117 |
| Melt temperature, °C. | 196 | 226 |
| Head pressure, psi | 2200 | 2600 |
| Cooling air temperature, °C. | 16 | 18 |
| Cooling air pressure in H$_2$O | 15 | 14 |
| Layflat, in. | 21 | 24 |

| Operating Conditions | Without Induced Flow Air Collar | With Induced Flow Air Collar |
|---|---|---|
| Gauge, mil. | 1.0 | 1.0 |
| Rate, lb/hr.-in. die | 5.6 | 9.9 |

EXAMPLE II

This example compares induced air flow which is discharged perpendicular to the direction of film travel to induced air flow which is discharged substantially in the direction of film travel. The perpendicular induced air flow was accomplished by the elimination of the vertical inner lip on the Induced Flow Air Collar.

The same resin used in Example I was used for this Example.

The extruder utilized was a 3½ inch water cooled Gloucester extruder having a length to diameter ratio of 24 to 1 and an 18 to 1 length to diameter ratio LLDPE screw.

The extruder had a 150 HP drive and 4 barrel heating zones. The same die used in Example I was used for this Example.

The same base air ring used in Example I was used for this Example. Air was supplied by a 35 HP blower through a 6 inch supply line.

The operating conditions are given below:

| Operating Conditions | Without Lip* | With Lip** |
|---|---|---|
| Extruder Screw Speed, RPM | 34 | 44 |
| Melt temperature, °C. | 219 | 224 |
| Head pressure, psi | 3590 | 4010 |
| Cooling air temperature, °C. | 5 | 5 |
| Cooling air pressure in H₂O | 16 | 19 |
| Layflat, in. | 21 | 21 |
| Gauge, mil. | 1.2 | 1.2 |
| Rate, lb/hr.-in. die | 7.8 | 9.5 |

*Flow discharged substantially perpendicular to film travel
**Flow discharged substantially in the direction of film travel It should be noted that when run without the lip at 7.8 lb/hr.-in. there were bubble pulsations that may not be commercially acceptable.

EXAMPLE III

This Example further demonstrates the increase in maximum stable rate using an induced flow air collar. The results are listed for a run without the induced flow air collar and two runs with an induced flow air collar.

The same resin used in Examples I and II was used for this Example.

The same extruder used in Example II was used for this Example.

An Egan 6 inch spiral mandrel die with a 120 mil final die gap was used for this Example.

The base cooling ring used was a single lip air ring having an inner lip diameter of 11 inches. The air ring was mounted 2 inches above the die with a partial sealing ring inserted which provided a ¼ inch gap between the die top surface and the bottom of the sealing ring. A 35 HP blower supplied cooling air to the 4 inlet ports of the air ring.

The extrusion conditions are given below:

| Operating Conditions | Without Induced Flow Air Collar | With Induced Flow Air Collar | |
|---|---|---|---|
| | | Run 1 | Run 2 |
| Extruder Screw Speed, RPM | 40 | 83 | 84 |
| Melt temperature, °C. | 230 | 246 | 249 |
| Head pressure, psi | 3430 | 4730 | 4880 |
| Cooling air temperature, °C. | 7 | 7 | 7 |
| Cooling air pressure in H₂O | 12 | 12 | 13 |
| Layflat, in. | 21 | 26 | 39 |
| Gauge, mil. | 1.4 | 1.5 | 1.3 |
| Maximum stable rate, lb./hr.-in. die | 9.9 | 15.7 | 16.3 |

What is claimed is:

1. A process for forming a blown film from a thermoplastic resin which comprises extruding said resin through the die lips of a tubular film die to form a film tube, expanding said film tube and directing a pressurized cooling medium in initial contact with said film tube, passing said cooling medium through a chamber surrounding said film tube, providing an air collar on the downstream edge of said chamber said air collar having discharge means for discharging cooling air substantially in the direction of film travel, and having an air conduit leading from the atmosphere to said discharge means, passing said cooling medium past said discharge means to create a reduced pressure zone proximate said discharge means and said film tube, providing a source of flow of cooling air, said cooling air being induced to flow from the atmosphere at a velocity of about 1 to 15 ft/sec. through said air conduit as a result of the differential pressure between the atmosphere and said reduced pressure zone said induced air exiting said discharge means substantially in the direction of film travel.

2. A process according to claim 1 wherein said cooling medium is air.

3. A process according to claim 1 wherein said pressurized cooling medium initially contacts said film tube substantially perpendicularly with respect to film tube travel.

4. A process according to claim 1 wherein said pressurized cooling medium initially contacts said film tube substantially parallel with respect to film tube travel.

5. A process according to claim 1 wherein said pressurized cooling medium and induced air mixture is directed through a rectifier to provide improved stability of said film tube.

6. A process according to claim 5 wherein said rectifier includes a diverging exit zone through which said pressurized cooling medium/induced air flow mixture passes.

7. A process according to claim 1 wherein said resin is an ethylene polymer.

8. A process according to claim 7 wherein said resin is a linear low density ethylene polymer.

9. A process for forming a blown film from an ethylene polymer which comprises extruding said polymer through the die lips of a tubular film die to form a film tube, expanding said film tube while directing pressurized cooling air in initial contact with said film tube, passing said cooling air through a chamber surrounding said film tube, providing an air collar on the downstream edge of said chamber said air collar having discharge means for discharging additional cooling air substantially in the direction of film travel, and having an air conduit leading from the atmosphere to said discharge means, passing said pressurized cooling air past said discharge means to create a reduced pressure zone proximate said discharge means and said film tube, providing a source of flow of additional cooling air, said source of additional cooling air being induced to flow from the atmosphere through said air conduit at a velocity of about 1 to about 15 feet per second, as a result of the differential pressure between the atmosphere and said reduced pressure zone, said induced air exiting said discharge means substantially in the direction of film travel.

10. A process according to claim 9 wherein said pressurized cooling air initially contacts said film tube substantially perpendicularly with respect to film tube travel.

11. A process according to claim 9 wherein said pressurized cooling air initially contacts said film tube substantially parallel with respect to film tube travel.

12. A process according to claim 9 wherein said pressurized air and induced air mixture is directed through a rectifier to provide improved stability of said film tube.

13. A process according to claim 12 wherein said rectifier includes a diverging exit zone through which said pressurized cooling air/induced air flow mixture passes.

* * * * *